US011550879B2

(12) United States Patent
Lev-Ami et al.

(10) Patent No.: US 11,550,879 B2
(45) Date of Patent: Jan. 10, 2023

(54) SYSTEM, DEVICE, AND METHOD OF PROVIDING AUTHENTICITY AND RIGHTS VERIFICATION MECHANISM FOR MEDIA CONTENT AND FOR ITS DERIVED VERSIONS

(71) Applicant: CLOUDINARY LTD., Petah Tikva (IL)

(72) Inventors: Tal Lev-Ami, Modiin (IL); Amnon Cohen-Tidhar, Zoran (IL)

(73) Assignee: CLOUDINARY LTD., Petah Tikva (IL)

( * ) Notice: Subject to any disclaimer, the term of this patent is extended or adjusted under 35 U.S.C. 154(b) by 162 days.

(21) Appl. No.: 17/105,554

(22) Filed: Nov. 26, 2020

(65) Prior Publication Data

US 2021/0224357 A1 Jul. 22, 2021

Related U.S. Application Data

(60) Provisional application No. 62/963,048, filed on Jan. 19, 2020.

(51) Int. Cl.
*G06F 21/10* (2013.01)
*H04L 9/32* (2006.01)

(52) U.S. Cl.
CPC ............ *G06F 21/10* (2013.01); *H04L 9/32* (2013.01); *G06F 2221/0722* (2013.01); *H04L 2209/603* (2013.01)

(58) Field of Classification Search
CPC .......... G06F 21/10; G06F 21/16; G06F 21/64; G06F 2221/0722; G06F 2221/0737;

(Continued)

(56) References Cited

U.S. PATENT DOCUMENTS 7,047,241 B1 * 5/2006 Erickson ................. G06F 21/10
380/278
10,361,866 B1 * 7/2019 McGregor ............ H04L 9/0637
(Continued)

FOREIGN PATENT DOCUMENTS

WO WO-2022049053 A1 * 3/2022

OTHER PUBLICATIONS

H. R. Hasan and K. Salah, "Combating Deepfake Videos Using Blockchain and Smart Contracts," in IEEE Access, vol. 7, p. 41596-41606, 2019, doi: 10.1109/ACCESS.2019.2905689. (Year: 2019).*

(Continued)

*Primary Examiner* — Michael Simitoski
(74) *Attorney, Agent, or Firm* — Browdy and Neimark, PLLC

(57) ABSTRACT

System, device, and method of providing authenticity and rights verification mechanism for media content and for its derived versions. A media authenticity server is configured to receive a content item, and to generate for it a record having a unique content identifier and indications of permitted modifications, and optionally also copyright information usage restrictions. The media authenticity server authorizes or blocks modifications requests regarding the content item. The media authenticity server tracks and logs the permitted modifications performed on the content item, and makes this log available for inspection to end-user devices via a web browser or via a content consumption application. Optionally, playback or consumption of a modified version of the content item is blocked, or is accompanied by a warning message, if the modified version is not associated with an authenticated log of permitted modifications.

28 Claims, 1 Drawing Sheet

(58) Field of Classification Search
CPC ......... H04L 2209/603; H04L 2463/101; H04L 2463/103; H04L 51/066; H04L 51/18; H04L 51/52; H04L 63/10; H04L 63/107; H04L 63/12; H04L 63/123; H04L 9/32; H04L 9/50

See application file for complete search history.

(56) References Cited

U.S. PATENT DOCUMENTS

| | | | | |
|---|---|---|---|---|
| 10,602,202 | B1* | 3/2020 | Taylor | H04L 9/3239 |
| 11,308,185 | B1* | 4/2022 | Paczkowski | G06F 21/64 |
| 11,341,179 | B1* | 5/2022 | Brandwine | G06F 16/9538 |
| 2003/0028490 | A1* | 2/2003 | Miura | G06Q 30/06 705/51 |
| 2004/0167858 | A1* | 8/2004 | Erickson | H04L 63/0428 705/55 |
| 2006/0041754 | A1* | 2/2006 | Hind | G06Q 20/3674 713/176 |
| 2006/0265427 | A1* | 11/2006 | Cohen | G06Q 99/00 |
| 2007/0226143 | A1* | 9/2007 | Sako | G06Q 30/06 705/50 |
| 2008/0189283 | A1* | 8/2008 | Quoc | G06F 16/14 707/999.009 |
| 2008/0244755 | A1* | 10/2008 | Cohen | G11B 27/34 726/27 |
| 2009/0327244 | A1* | 12/2009 | Rizal | G06F 16/1834 709/204 |
| 2010/0088522 | A1* | 4/2010 | Barrus | G06F 21/64 713/181 |
| 2011/0037767 | A1* | 2/2011 | Casanova | H04L 51/10 345/473 |
| 2012/0072503 | A1* | 3/2012 | Kowalewski | H04L 65/1083 709/229 |
| 2012/0090000 | A1* | 4/2012 | Cohen | H04N 21/8355 725/32 |
| 2012/0233029 | A1* | 9/2012 | Piersol | G06Q 30/00 705/34 |
| 2012/0265901 | A1* | 10/2012 | Swenson | H04N 21/234309 709/246 |
| 2013/0103689 | A1* | 4/2013 | Choi | H04N 21/6379 707/737 |
| 2013/0124691 | A1* | 5/2013 | Suryavanshi | H04L 67/55 709/219 |
| 2014/0032900 | A1* | 1/2014 | Donahue | G06F 21/6209 713/193 |
| 2014/0223099 | A1* | 8/2014 | Kidron | G06F 12/0806 711/118 |
| 2014/0248001 | A1* | 9/2014 | Leask | G06F 21/10 382/299 |
| 2014/0359085 | A1 | 12/2014 | Chen | |
| 2015/0074413 | A1* | 3/2015 | Hao | H04L 9/321 713/176 |
| 2015/0248384 | A1* | 9/2015 | Luo | G06Q 10/00 715/229 |
| 2016/0029053 | A1* | 1/2016 | Zhou | H04L 65/612 725/109 |
| 2016/0247324 | A1* | 8/2016 | Mullins | G02B 27/0179 |
| 2017/0017801 | A1* | 1/2017 | Rosset | G06F 21/10 |
| 2017/0024551 | A1 | 1/2017 | Phadke | |
| 2017/0126702 | A1* | 5/2017 | Krishnamurthy | G06F 21/604 |
| 2017/0132271 | A1* | 5/2017 | Jiao | G06F 16/122 |
| 2018/0068091 | A1* | 3/2018 | Gaidar | G06F 21/10 |
| 2018/0152443 | A1* | 5/2018 | Henrique Minatel | H04B 5/0056 |
| 2018/0335935 | A1* | 11/2018 | Larson | G06F 40/166 |
| 2019/0311202 | A1* | 10/2019 | Lee | G06K 9/627 |
| 2019/0347438 | A1* | 11/2019 | Hamlin | G06F 21/6218 |
| 2019/0356644 | A1* | 11/2019 | Lyons | H04L 9/0643 |
| 2019/0391972 | A1* | 12/2019 | Bates | G06F 16/51 |
| 2020/0051232 | A1* | 2/2020 | McGregor | H04L 9/3239 |
| 2020/0275166 | A1* | 8/2020 | Jordan | G06F 21/64 |
| 2021/0127085 | A1* | 4/2021 | Greaves | H04N 5/913 |
| 2021/0133721 | A1* | 5/2021 | Ponceleon | G06Q 30/0214 |
| 2021/0200903 | A1* | 7/2021 | Singh | G06F 21/645 |
| 2021/0209196 | A1* | 7/2021 | Arana | G06F 21/44 |
| 2021/0233204 | A1* | 7/2021 | Alattar | G06T 1/005 |

OTHER PUBLICATIONS

European Search Report in patent application EP 21152116.6, dated Jun. 7, 2021.

* cited by examiner

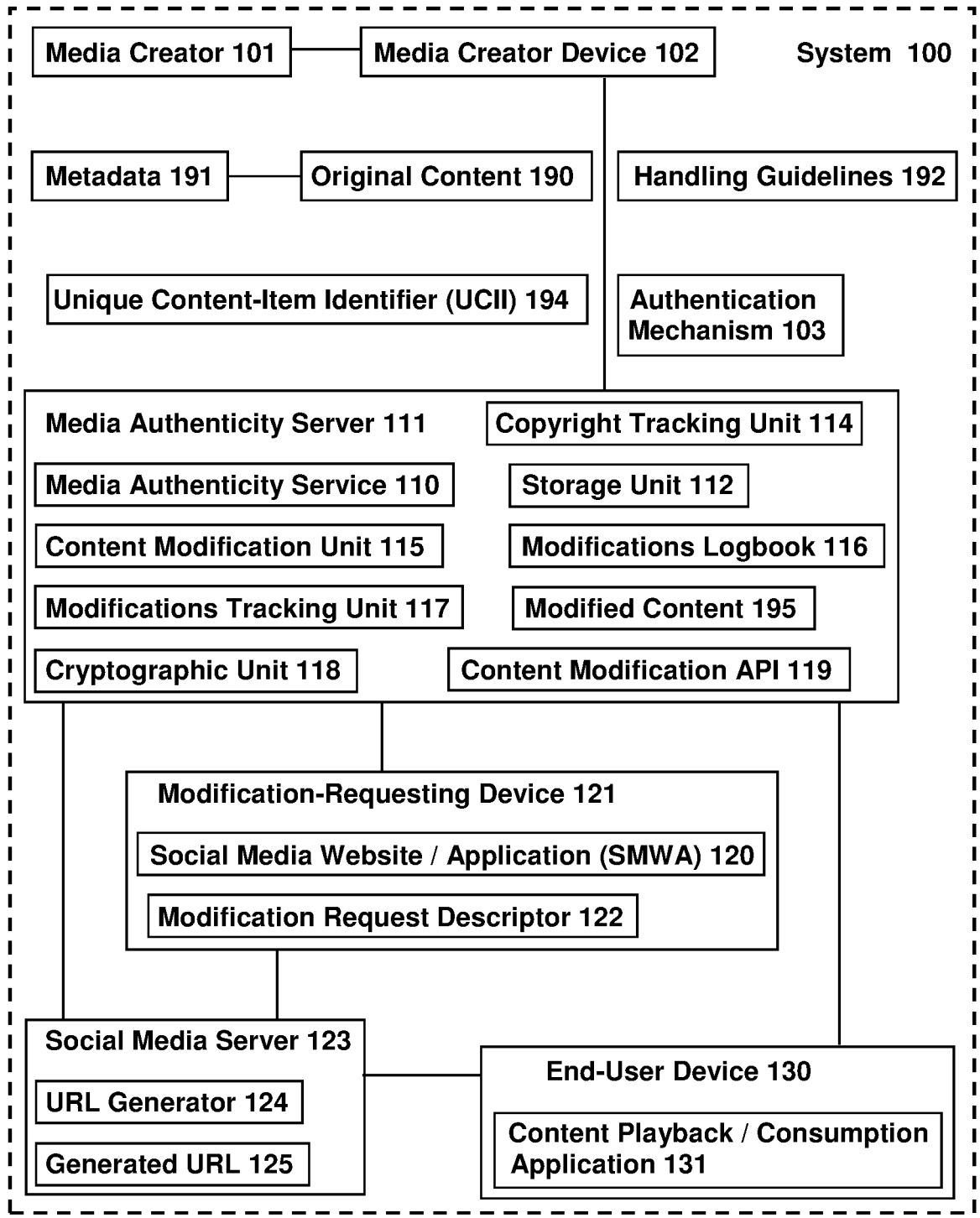

SYSTEM, DEVICE, AND METHOD OF PROVIDING AUTHENTICITY AND RIGHTS VERIFICATION MECHANISM FOR MEDIA CONTENT AND FOR ITS DERIVED VERSIONS

CROSS-REFERENCE TO RELATED APPLICATIONS

This patent application claims benefit and priority from U.S. 62/963,048, filed on Jan. 19, 2020, which is hereby incorporated by reference in its entirety.

FIELD

The present invention relates to communication systems and electronic devices.

BACKGROUND

Electronic devices and computing devices are utilized on a daily basis by millions of users worldwide. For example, laptop computers, desktop computers, smartphone, tablets, and other electronic devices are utilized for browsing the Internet, consuming digital content, streaming audio and video, sending and receiving electronic mail (email) messages, engaging in Instant Messaging (IM) and video conferences, playing games, or the like.

Some activities that are performed via an electronic device, involve consumption of digital content. For example, a user may read on his tablet a news article in an online magazine, or may watch via his smartphone or laptop computer an online video related to current affairs on a social media or social networking website or application.

SUMMARY

Some embodiments may provide systems, devices, and methods for determining authenticity of original media content and for providing authenticity verification mechanism for media content and the rights therein, as well as for derived versions and/or modified versions and/or edited versions thereof.

Additionally or alternatively, some embodiments may further be used for monitoring, tracking, validating and/or verifying copyright (or other legal right or Intellectual Property (IP) right) in a content item (e.g., an original content item, as well as derived versions or modified versions or edited versions thereof, cropped versions, re-sized versions, re-encoded or transcoded versions, converted versions, or the like), and/or for tracking or determining the identity and/or contact details and/or other information of the rightful or the original copyright owner (or IP rights owner), for purposes of, for example, obtaining or requesting or checking or verifying usage rights and/or distribution rights and/or publishing rights, determining data related to limitations or constraints on the usage of the content item as well as automatically enforcing such usage limitations or usage constraint, determining and/or enforcing policies or rights that relate to payment of royalties or licensing fees or other monetary transactions related to the content item and/or to its playback or display or usage, and/or for other suitable purposes.

The present invention may provide other and/or additional advantages and/or benefits.

BRIEF DESCRIPTION OF THE DRAWINGS

FIG. 1 is a block diagram illustration of a system, in accordance with some embodiments of the present invention.

DETAILED DESCRIPTION OF SOME DEMONSTRATIVE EMBODIMENTS

For demonstrative purposes, some portions of the discussion herein may demonstrate some aspects of the present invention in the context of a Social Media or a Social Network application or "app" or website or webpage or system; however, this is only a non-limiting example, and embodiments of the present invention may be utilized in conjunction with other types of systems, applications, "apps", websites and/or systems; for example, online venues or websites or "apps" or digital versions of a news organization, an online or digital or electronic newspaper or magazine or periodical, a daily or a periodical publication system, a continuous or real-time content publication system, a system for publishing or posting content online and/or in a digital or electronic way (e.g., with regard to current events, politics, sports, culture, business, finance, weather, and/or other topics or areas that are often covered in such publications), an online or digital or electronic platform for journalism or blogging or video-blogging or vlogging, an online website or webpage or application or "app" or platform of a television channel or a broadcasting channel or a cable television channel or a satellite television channel or other channels, and/or other suitable platforms or content distribution channels or content publications channels.

For demonstrative purposes, some portions of the discussion herein may demonstrate some aspects of the present invention in the context of verifying and/or tracking the authenticity of (or the copyright related to) a video content-item; however, this is only a non-limiting example, and embodiments of the present invention may be utilized in conjunction with other types of content items, such as, audio content, music, speech, images, photographs, multimedia presentations, infographics, animation sequences, rich media content items, or the like.

The Applicants have realized that social media and social networks, that implemented through are accessible via websites and applications or "apps", have become a major distribution channel for media, digital content, audio, video, textual articles, information items, and various other types of media content.

The Applicants have also realized that some users download images and/or videos and/or text and/or graphics from one or more websites or sources, and then edit or manipulate or modify them, sometimes by adding content and/or removing content and/or modifying content, and then post or re-post such modified content or altered content or manipulated content to one or more social media channel where they are shared, forwarded and further manipulated.

The Applicants have realized that some types of manipulation or modification operations that are performed on original or authentic media content, are legitimate and/or legal; for example, they are converted versions of the original content, which preserve the meaning and/or comprehension and/or context of the original media. For example, a user may download an original video depicting a news event, captured originally at high definition (e.g., 1080p resolution) and at high frame-rate (e.g., 60 FPS); may then convert it into a reduced-size video (e.g., at 480p resolution and at 30 FPS frame-rate); and may then share or upload or post the modified, reduced-size, video to a social media channel. Similarly, a user may legitimately crop or trim or cut a lengthy video in order to post or re-post only a particular segment-of-interest therefrom. Similarly, a user may convert a media content to a particular format which is adapted or is more suitable to a particular end-user device or to a particular type of devices, e.g., producing a "mobile friendly" version of a digital content item, or a "low bandwidth friendly" version thereof, or otherwise adapting the original content to one or more screen sizes, network conditions, bandwidth conditions, or the like. Similarly, a user may modify a video or an image by legitimately adding a watermark or a logo or a caption to it (e.g., a caption of "Courtesy of XYZ Broadcasting Inc.", or a caption of "This video depicts content that some viewers may find disturbing"), adding a copyright notice or a "courtesy of" notice, or the like.

The Applicants have also realized that some manipulations, even if performed legitimately or without intention to deceive, may actually cause semantic changes or direct changes or indirect changes in the media itself or in its perception or understanding by some or all of its viewers. For example, trimming or cutting of a lengthy video to produce a shorter segment, or cropping a video or an image, involves removal of some content which may be important or even crucial to the understanding of the entire video, or such removal may modify the meaning of the content that was kept. Similarly, an audio track may be modified to manipulate the meaning of uttered phrases or words.

The Applicants have further realized that with recent advances of what is sometimes called "deep-fake" or "deepfake" technology, it is possible to manipulate media content even further, replacing speakers and voices, replacing or adding words spoken, modifying images and video content, and performing other manipulations. For example, a precise editing of an audio/video segment, in which a political figure said "I do not support John Smith", may remove precisely the word "not" from the video and the audio track, in a smooth manner, resulting in a perfect or an almost-perfect audio/video clip in which that political figure appears to have said "I do support John Smith".

The Applicants have realized that on the one hand, there is a need to allow modification of digital content for legitimate purposes, such as for adapting to particular types of consumption devices or for network conditions; while on the other hand, there is a need to detect that a particular modified content item is illegitimate or non-authentic or may be part of a "deep-fake" operation.

The present invention includes a system and method service that allows media content to be manipulated or modified, while recording or tracking or logging the particular type and details of the manipulations or modifications that were done to the media content, thereby enabling to subsequently validate or verify the authenticity of the manipulations or modification. The system may allow to track back the media content to its original source, directly or in a step-by-step reverse order, in order to check (e.g., automatically or semi-automatically or manually) whether the original source of the media content is indeed a legitimate source or a trustworthy source (e.g., a well-known news organization), while allowing the viewer to see or to check all the manipulations and modifications that have been done on the original media content and on further modified versions thereof.

In accordance with the present invention, social networks or social media websites and applications may then limit (or entirely prevent or block) the distribution or the serving of a media content that has not been properly authenticated, to prevent the proliferation of inauthentic media or manipulated media or "fake news" or disinformation or misinformation. In some embodiments, optionally, the system may automatically or semi-automatically add or inject or insert, into the content item itself (e.g., into the video, into the audio, into the image, or the like), a caption or a message or a textual component or a graphical indicator or other element that indicate that the authenticity of this media content is estimated to be (or is determined to be) questionable or problematic or false or fake or possibly-fraudulent or possibly-fake or possibly-false; and/or the system may cause such message or indicator(s) to be added into the meta-data of the relevant file or content item, and/or to be added as a caption or a message that would be displayed or conveyed in proximity to the questionable content item (or, which may be shown as a pre-roll or a post-roll or an in-roll video message), and/or that would otherwise indicate such information to viewers and/or consumers and/or web-browsers and/or digital content consumption applications. The system still allows social media providers and other distributors of content to perform the media modification operations that are needed for properly or efficiently serving the media to their end-user customers, such as, allowing such social media providers to generate reduced-size or mobile-friendly versions of media content that would still enjoy the benefits of being verified as authentic.

In some embodiments, content owners or content publishers may also consider changing their redistribution rules, to only allow distribution of their content via a Media Authenticity Service or via a Media Authenticity System, as it prevents unjust or illegitimate or illegal manipulation or modification of their original content.

When a viewer or a distributor of the media content wishes to view the original media content, or wishes to view the list of manipulations or modifications performed on the original media content, such user may access metadata within the media content itself, and/or may access the Media Authenticity Service and request from it to provide this information. All media content that is generated or processed by (or is distributed through) by the Media Authenticity Service may be cryptographically signed, to prevent tampering and/or to ensure that the given media content is authentic. In some embodiments, optionally, a log which tracks modifications or manipulations to a media content, may optionally be stored in (or as) a blockchain data-set, having a group of cryptographically linked records or "blocks" (e.g., structured as a hash tree or a Merkle tree); for example, each block storing a cryptographic hash of the previous block, a timestamp, and the next transaction data (e.g., the next modification).

In some embodiments, web browsers as well as application or "apps" for media playback or for digital content consumption or playback, may be configured to automatically validate media content that is served to them and/or that is included in a website and/or that is provided to them for playback or consumption; and such applications may further indicate to the end-user whether a media content is indeed properly authenticated, and may allow the user easy access to its authenticity information and log of prior modifications, all the way back to the original source of the original media content. In some embodiments, such functionality may be "built in" or integrated within a web browser or a media playback application or device; or may be implemented as an extension, an add-on, a plug-in, or other suitable addendum module.

In some embodiments, optionally, the Media Authenticity Service may allow the merging or joining of multiple media content items, which may be obtained from multiple respective sources. In case of such merging or joining, the authenticity information that accompanies (or pertains to) the merged or joined item, may include references to each one of the original media content items, as well as the particular manipulation and modification operations that were performed on each one of them pre-merger, as well as the merger or joining operations itself, and also the modifications performed on the joined or merged content post-merger.

In some embodiments, multiple Media Authenticity Services may operate in a distributed manner or as a federation or in accordance with a peer-to-peer structure or a client/server architecture or a distributed architecture, enabling trust to be established between or among such multiple services or servers or entities. For example, each service may utilize its own cryptographic signatures to authenticate the original content items and the manipulations or modifications performed on them. Then, when a Media Authentication Service utilizes another service's media content item, the later system appends the external authenticity information as part of its own, or otherwise incorporates the previous authentication data and augments it.

In some embodiments, a Media Creator does not allow access to the original or "raw" media content item, or may allow access only to an already-modified media content item after some initial manipulation or modification (e.g., addition of watermarks or logo or caption by the media creator). In such cases, optionally, the minimally manipulated accessible media content item would be part of the authenticity information, and would be regarded as the initial "source" content, even if it is not necessarily the "raw" footage as originally captured. However, in some embodiments, the original or "raw" or non-modified or non-manipulated or non-edited media content item should still be available for inspection, such as in case of an audit by a particular auditor or trusted party, but would not necessarily be available for inspection and/or consumption by the general public.

Reference is made to FIG. 1, which is a schematic block diagram illustration of a system 100, in accordance with some demonstrative embodiments of the present invention. For example, a Media Creator 101 is an entity or a person that has a new or Original Content 190 that it wishes to upload to a Media Authenticity Service 110. The Media Creator 101 utilizes a Media Creator Device 102, such as a laptop computer or desktop computer or tablet or smartphone, in order to send or upload or transfer or submit the Original Content 190 to the Media Authenticity Service 110, which may be a unit or module or service that runs on a Media Authenticity Server 111.

The Media Creator 101 utilizes an Authentication Mechanism 103 in order to authenticate itself, digitally and cryptographically, towards the Media Authenticity Server 111. For example, the Media Creator 101 utilizes an Application Programming Interface (API), or a User Interface (UI) or a Graphical User Interface (GUI), to provide authentication credentials and/or one or more authentication factors (e.g., username and password; API key) to the Media Authenticity Server 111.

Upon authentication of the Media Creator 101 towards the Media Authenticity Server Service 100, the Media Creator 101 proceeds to send or transfer or transmit or upload the Original Content 190 to the Media Authenticity Service 110. Optionally, the Original Content 190 may be accompanied by Metadata 191, for example, a timestamp indicating when exactly the media was captured or created, identifier of the creator or photographer, identifier of the geographic location in which media content was captured or generated, metadata indicating other characteristics of the Original Content 190 as determined locally by the Media Creator Device 102 (e.g., frame-rate, resolution in pixels, video codec used, total length in seconds, color-depth used, or the like). In some embodiments, such metadata (or part of it) may be embedded within the Original Content 190 itself using one or more suitable techniques (e.g., EXIF data; header data), and/or may be added externally or augmented or appended by the Media Creator Device 102 in a manner that accompanies the Original Content 190 (e.g., as an accompanying record or file). Additionally or alternatively, the Media Creator 101 may utilize the Media Creator Device 102 to define or set or configure or attach one or more relevant settings or definitions or constraints or Handling Guidelines 192, which define or limit or guide how exactly this particular Original Content 190 should be handled or processed by the Media Authenticity Service 110 (and/or by third parties). For example, the Handling Guidelines 192 may indicate whether or not the Original Content 190 may be consumed or viewed or accessed or downloaded by the general public, or by a particular type(s) of users (e.g., only by authorized personnel or trusted administrator of the Media Authenticity Service 110).

In response to the uploading or the submission of the Original Content 190 and its accompanying Metadata 191 and Handling Guidelines 192, the Media Authenticity Service 110 generates a Unique Content-Item Identifier (UCII) 194 for this particular Original Content 190, which enables referring to the original content 190 as uploaded for further consumption, manipulation, distribution and/or tracking. The UCII 194 may be provided by the Media Authenticity Service 110 back to the Media Creator Device 102, for its future reference. The Original Content 190 is stored in a Storage Unit 112 that is controlled (e.g., exclusively) by the Media Authenticity Service 110, and which may be accessed only by the Media Authenticity Service 110 or by a third-party that was explicitly authorized by the Media Authenticity Service 110 via proper access credentials.

Subsequently a Social Media Website/Application (SMWA) 120 may require obtaining a downscaled and/or reduced-size and/or mobile-friendly and/or optimized version of that particular Original Content 190, for example, for the purpose of distributing or sending to one or more end-users as part of an email campaign. The system 100 may operate in accordance with one or more operational routes, some of which are demonstrated herein.

In a first demonstrative operational route, a person working for the SMWA 120 may utilize a UI or GUI or other interface or website or webpage, that are provided or supplied or controlled by the Media Authenticity Service 110, to describe the manipulation(s) or modification(s) that are needed to be performed on the Original Content 190. For example, a Modification-Requesting Device 121, operated by a marketing manager at the SMWA 120, may be utilized by that person in order to submit a Modification Request Descriptor 122, which identifies the particular Original Content 190 (e.g., referring to it by its Unique Content-Item Identifier (UCII) 194, and which describe which modifications are requested (e.g., reduce the frame-rate from 60 FPS to 30 FPS; reduce the resolution from 1080p to 480p; change the codec from H.265 to H.264; reduce the color-depth or the color palette from 16-bit RGB color to 8-bit grayscale; and so forth). The Media Authenticity Service 110 triggers or commands a Content Modification Unit 115, which may be part of the Media Authenticity Server 111 or may be associated with it (or may be cloud-based yet accessible by the Media Authenticity Server 111 with proper credentials) to perform the requested modifications or manipulations or conversions and to generate a Modified Content 195. A Modifications Logbook 116 is created and updated, to indicate that this particular Original Content 190, has been subject to this specific modification. The Modifications Logbook 116 is part of the Media Authenticity Server 111 or is associated with it (or, is stored in a cloud-based repository that is accessible by the Media Authenticity Server 111 with proper credentials). The updating of the Modifications Logbook 116 is performed by a Modifications Tracking Unit 117. A description of the modifications that were performed, is recorded or added as part of the authenticity information of that particular Original Content 190, as the Modifications Tracking Unit 117 operates to attach or to add such modification descriptions to the Modified Content 195 that was generated; additionally or alternatively, a link or hyperlink or other pointer is generated or is attached to the Modified Content 195, or is associated with the Modified Content 195, pointing to the location where the authenticity information (including the logbook of modifications performed) can be requested or accessed or obtained. A Cryptographic Unit 118 of the Media Authenticity Server 111 then cryptographically signs the Modified Content 195 together with the authenticity information, and attaches the digital cryptographic signature information to the Modified Content 195 itself. The result is then returned (e.g., sent, transmitted, transferred) to the original Modification-Requesting Device 120 of the SMWA 120, which may then utilize the Modified Content 195 for its purpose.

In a second demonstrative operational route, a Social Media Server 123 that is associated with the Social Media Website/Application (SMWA) 120, utilizes a Content Modification API 119 supplied by the Media Authenticity Service 110 to submit an API request for content modification of the Original Content 190. For example, the Content Modification API 119 generated by the Social Media Server 123 includes a description of the requested modifications or manipulation that are requested to be performed on the Original Content 190, as well as the Unique Content-Item Identifier (UCII) 194 of the Original Content 190. Similarly to the first operational route described above, the Media Authenticity Service 110 then triggers or commands the Content Modification Unit 115 to perform the requested modifications and to generate the Modified Content 195. A Modifications Logbook 116 is created and updated, to indicate that this particular Original Content 190, has been subject to this specific modification. The updating of the Modifications Logbook 116 is performed by the Modifications Tracking Unit 117. A description of the modifications that were performed, is recorded or added as part of the authenticity information of that particular Original Content 190, as the Modifications Tracking Unit 117 operates to attach or to add such modification descriptions to the Modified Content 195 that was generated; additionally or alternatively, a link or hyperlink or other pointer is generated or is attached to the Modified Content 195, or is associated with the Modified Content 195, pointing to the location where the authenticity information (including the logbook of modifications performed) can be requested or accessed or obtained. The Cryptographic Unit 118 of the Media Authenticity Server 111 then cryptographically signs the Modified Content 195 together with the authenticity information, and attaches the digital cryptographic signature information to the Modified Content 195 itself. The result is then returned (e.g., sent, transmitted, transferred) to the Social Media Server 123, which may then utilize the Modified Content 195 for its purpose.

In a third possible operational route, the Social Media Website/Application (SMWA) requires a downscaled and/or optimized and/or mobile-friendly and/or reduced-scaled (or otherwise modified) version of the media, for delivery (e.g., directly or indirectly, via a website, a webpage, an application or "app", via an email message, or the like) to the end-user. The Social Media Server 123 triggers or launches its URL Generator 124, which generates a Universal Resource Locator (URL) 125 or other pointer or link or hyperlink that points to the location of the Modified Content 195 as stored in the Storage Unit 112 of the Media Authenticity Server 111, which is the authenticated modified version of the original content. In some embodiments, the generated URL 125 also includes the Unique Content-Item Identifier (UCII) 194 of the Original Content 190, or an encoded version thereof. In some embodiments, the generated URL 125 also includes a digital signature or a hashing value or other indicator or token that ensures that the URL was indeed generated by an authorized Social Media Server 123. The generated URL 125 is provided or served or transferred to the electronic device (e.g., laptop computer, desktop computer, smartphone, tablet, or the like) of the end-user (e.g., a consumer of the digital content), such as, as part of the website or webpage or application that such End-User Device 130 is accessing or using. The End-User Device 130 typically runs a Content Playback/Consumption Application 131, which may be a web browser, a dedicated application or "app", a playback module, a video presentation module or video playback module, an image viewing module, an audio playback module, or the like. The End-User Device 130 then uses this URL to directly request and fetch the modified media content from the Media Authenticity Server 111, without further involvement of the Social Media Server 123. The Media Authenticity Server 111 performs the requested manipulation or modification of the media content, records the manipulation or modification being done as part of the authenticity information, attaches this information to the modified media content or attaches a link or other pointer to the location where the authenticity information can be requested and fetched, and cryptographically signs the modified media content together with the authenticity information and attaches the signing information to the modified media content. The result is returned directly to the End-User Device 130.

In accordance with the present invention, the End-User Device 130, and its browser or social media application or other suitable Content Playback/Consumption Application 131, processes media content which includes (or which is associated with, or is linked to) an authenticity information record, in the format returned or provided or served by the Media Authenticity Server 111 (such information obtained directly from the Media Authenticity Server 111, or, in some embodiments, obtained directly from another server yet having the digital signature of the Media Authenticity Server 111). The browser or the Content Playback/Consumption Application 131 may then validate or verify that the digital cryptographic information attached to the media content (or being part of it, or being associated with it or linked to it) is indeed valid or verified or authentic (e.g., by verifying the digital cryptographic signature of the Media Authenticity Server 111). If it is valid, then the browser or the Content Playback/Consumption Application 131 utilizes or displays or playbacks or shows the media content. Optionally, the browser or the Content Playback/Consumption Application 131 may also provide a shortcut or link or other GUI element (e.g., via a contextual menu which may be accessed via a right-click) that allows the end-user to view the full chain of modifications or manipulations performed on the original content item, and/or to view or access a link to the original content (if it was made available to the general public; or, upon proper user credentialing, if it was made available in an access control manner to some but not all users). If the authenticity information of the media content is external (e.g., is not embedded in the media content itself or is not attached to it), then the browser or the Content Playback/Consumption Application 131 may utilize a link to the external authenticity information (e.g., the link itself being embedded in the media content, or being attached to it) to access its location and to fetch or download the authenticity information upon a user request. If the authenticity information is not successfully validated by the Content Playback/Consumption Application 131, then the media content is marked or tagged as possibly suspicious or possibly fraudulent or possibly fake or possibly manipulated, and a notification or warning or other alert may be shown to the end-user device, and may also be sent or transmitted to third parties (e.g., to an entity that is known to the system as the submitting entity which submitted or uploaded that content item, and/or to other entities). In some embodiments, the Content Playback/Consumption Application 131 may be configured to block or to not show or to not display or to not playback, such content item which lacks authenticity information or whose authenticity information failed verification. In some embodiments, one or more other fraud-prevention or fraud-mitigation operations may be performed or may be triggered or initiated or launched; for example, in some embodiments, the browser or the application or the Content Playback/Consumption Application 131 may prevent or may block a financial transaction or a retail transaction or an online purchase transaction that is attempted to be performed (or submitted) within the same page or the same website that presented or attempted to present the content items whose authenticity information is lacking or failed verification.

Additionally or alternatively, some embodiments may further be used for monitoring, tracking, validating and/or verifying copyright (or other legal right or Intellectual Property (IP) right) in a content item (e.g., an original content item, as well as derived versions or modified versions or edited versions thereof, cropped versions, re-sized versions, re-encoded or transcoded versions, converted versions, or the like), and/or for tracking or determining the identity and/or contact details and/or other information of the rightful or the original copyright owner (or IP rights owner), for purposes of, for example, obtaining or requesting or checking or verifying usage rights and/or distribution rights and/or publishing rights, determining data related to limitations or constraints on the usage of the content item as well as automatically enforcing such usage limitations or usage constraint, determining and/or enforcing policies or rights that relate to payment of royalties or licensing fees or other monetary transactions related to the content item and/or to its playback or display or usage, and/or for other suitable purposes.

For this purpose, a Copyright Tracking Unit 114 may be included in system 100; such as, being a part of Media Authenticity Server 111 and/or being associated therewith, or being a part of another unit or device or system 100, or being operatively associated with one or more units of system 100. The Copyright Tracking Unit 114 may add copyright (or other IP rights) information or data to an original or genuine content media item; and such information may indicate the name or identity of the copyright holder or copyright owner or the author or creator of the content media, one or more contact details thereof (e.g., email address, telephone number, website, street address), indications of one or more limitations or constraints that may be associated with the content media item, such as: distribution or playback or serving not allowed; modification not allowed; distribution or playback or serving not allowed in a particular geographical region or by servers located in a particular geographical region or to end-user devices that are located there; distribution or playback or serving allowed in a particular geographical region or by servers located in a particular geographical region or to end-user devices that are located there; playback to the same device is limited to N times per D days; skipping forward or backward within the video is allowed, or is not allowed; distributions or serving or playback licenses that are allowed or that apply (e.g., an indication that this content item is associated with Playback License Terms number 123 of company XYZ; or that this content item is associated with a particular Creative Commons (CC) license); indications of royalties or monetary payments that are due for distribution or serving or playback of the content item; or the like. Such information may be provided or uploaded by the entity that uploaded or provided the content; or may be obtained by the system, automatically or semi-automatically or manually, from one or more repositories of information or from third party sources; or may be obtained based on one or more pre-defined rules (e.g., a rule indicating that "any video content that is uploaded from a computer server having an Internet Protocol address of 5.6.7.8 is automatically associated with a CC-BY license"). In some embodiments, the information may be embedded into the content item or into its header or meta-data; or may be appended to it, or may be otherwise linked to it or be associated with it; and/or may be stored in an external repository or database at a suitable record or field that is related to that particular content item.

Upon every modification or manipulation of the original content item, the copyright (or other legal right or IP right) information may be updated or augmented; for example, indicating that the Original content item was created by Adam on Jan. 1, 2019, and that the Cropped-1 version of the content item was created by Bob on Feb. 2, 2019, and that the Resized-2 version thereof was created by Carla on Mar. 3, 2019, and so forth. The records may be appended or augmented to the original copyright information, and/or may otherwise accompany the content item and its derived versions or modified versions. In some embodiments, the system may indicate that a first entity holds the copyright for the original content item, and that a second entity holds the copyright for a particular derived or modified version thereof, and/or that a third entity holds the copyright for yet another particular version thereof, or the like.

In some embodiments, a unit or module or application or "app" or content consumption device or content consumption application, or a server computing or a serving entity, or a browser or other suitable module, may request, obtain, display and/or verify the copyright information (or other legal rights information), based on such record(s) as stored and updated by the Copyright Tracking Unit 114 or by similar units or modules which may be part of other units or devices in the system. For example, the copyright information may be obtained or inspected or displayed, based on the unique ID number or other unique identifier of the content item being inspected (original, or modified version thereof). In some embodiments, optionally, a browser or an "app"

may be configured to block or to prevent the playback of a content item, whose copyright information is missing or is not available (entirely, or partially, or temporarily); or to allow the playback of such content together with an accompanying warning message or notification. In some embodiments, a server computer may avoid or may prevent or may limit the serving of such content item, to one or more end-user devices, or to one or more geographical regions, or to the entirety of end-user devices and/or geographical locations. In some embodiments, optionally, the Copyright Tracking Unit 114 or other suitable unit of system 100, may automatically generate and send a notification to the creator or owner or copyright holder of an original content item, upon receiving into the system a derived version thereof or a modified version thereof, or upon receiving an incoming request or command to perform conversion or modification of the original content item, or upon serving to an end-user or to other entity a modified version or a derived version of the original content item; optionally, together with an indication of the entity or end-user device or other target entity or recipient or digital venue that has submitted the request.

In some embodiments, optionally, the Copyright Tracking Unit 114 may further be associated with (or may include) a monetary management module, which may facilitate or may perform the electronic collection of royalties or other payments upon the serving or the playback of a content item, including the collection of the relevant payment from the end-user and/or from the recipient entity, and/or including the transfer of the relevant payment to the copyright holder or owner; optionally while keeping a pre-defined portion or percentage of the collected payment as commission.

The terms "content" or "media content" or "content-item" as used herein may include, for example, a video, an audio-video, a video file, a video segment, a multimedia content that may include graphics and/or motion and/or video and/or sound and/or animation, a non-static multimedia item (e.g., having at least two frames that are at least partially different from each other), a file or a stream of bits or bytes that represents or that carry an image or a video content, a video-only or visual-only multimedia item that lacks audio or a silent video (e.g., represented as a GIF or an Animated GIF file or item), a video file or a streaming video that is encoded and/or compressed and/or represented using one or more suitable video codecs (e.g., AVC codec H.264, or HEVC codec or H.265, or the like) and/or stored or contained in a suitable container or file format (e.g., MP4, or MOV, or AVI, or MKV, or WebM, or a container for VP8 or VP9 or AV1 video, or the like), an animation or a dynamic presentation that is represented using bitmap graphics and/or vector graphics and/or textual elements and/or a program script (e.g., JavaScript, HTML5, CSS, or the like), a static content item or image (e.g., stored as JPG or PNG or TIF or other suitable image format), a dynamic or non-static content-item in which at least a portion of the content-item is modified or replaced (e.g., automatically, or autonomously; or at a particular time-point; or in response to user engagement such as hovering or clicking or tapping), a rich media content-item, or the like.

In some embodiments, in order to perform the various computerized operations of system 100, such system may be equipped with relevant hardware components and/or software components, for example: a processor able to process data and/or execute code or machine-readable instructions (e.g., a central processing unit (CPU), a graphic processing unit (GPU), a digital signal processor (DSP), a processing core, an Integrated Circuit (IC), an Application-Specific IC (ASIC), one or more controllers, a logic unit, or the like); a memory unit able to store data for short term (e.g., Random Access Memory (RAM), volatile memory); a storage unit able to store data for long term (e.g., non-volatile memory, Flash memory, hard disk drive, solid state drive, optical drive); an input unit able to receive user's input (e.g., keyboard, keypad, mouse, touch-pad, touch-screen, trackball, microphone); an output unit able to generate or produce or provide output (e.g., screen, touch-screen, monitor, display unit, audio speakers); one or more transceivers or transmitters or receivers or communication units (e.g., Wi-Fi transceiver, cellular transceiver, Bluetooth transceiver, wireless communication transceiver, wired transceiver, Network Interface Card (NIC), modem); and other suitable components (e.g., a power source, an Operating System (OS), drivers, one or more applications or "apps" or software modules, or the like). Such components may be part of, or may be associated with, any of the devices or units of system 100.

For demonstrative purposes, and in order to avoid overcrowding of the drawing, a Cryptographic Unit is shown only in one of the entities of system 100; however, each one of the devices, units or servers of system 100 may comprise its own cryptographic unit, able to perform suitable operations of encryption, decryption, digital signing, signature verification, hashing, or the like.

Some embodiments include a system comprising: a Media Authenticity Server, comprising one or more processors that are configured: to receive a content item from a Content Creation Device, to perform digital and cryptographic authentication of said Content Creation Device, and to generate for said content item a Unique Content-Item Identifier (UCII), that operably accompanies said content item, and that uniquely identifies said content item, and that further indicates which modification operations are permitted with regard to said content item; subsequently, to receive from a Modification-Requesting Device, a Modification Request Descriptor which identifies said content item via said UCII, and which indicates a particular requested modification to said content item; to authorize said particular requested modification to said content item, only if said particular requested modification is indicated as permitted in said UCII.

In some embodiments, the Media Authenticity Server further comprises: a Modifications Tracking Unit, to track permitted modifications to said content item, and to create or update a modifications logbook that is associated with a modified version of said content item, and that logs (i) which permitted modifications were performed, (ii) a time of performance of each permitted modification, and (iii) an identifier of each entity that performed each of said permitted modifications.

In some embodiments, the Media Authenticity Server further comprises: a cryptographic unit, to generate a cryptographic signature on (I) a modified version of said content item, and (II) an authenticity information item that indicates which permitted modifications were performed on a previous version of said content item to yield said modified version of the content item; and to provide said cryptographic signature to said Modification-Requesting Device together with said modified version of the content item.

In some embodiments, the particular requested modification is performed by a content modification unit that is part of the Media Authenticity Server, and is not part of the Modification-Requesting Device, to ensure that only permitted modifications are performed on the content item.

In some embodiments, the particular requested modification is performed in response to an Application Programming Interface (API) request, submitted by the Modification-Requesting Device to the Media Authenticity Server.

In some embodiments, the modification request is generated by a Social Media Server, which requests to provide a downscaled or mobile-friendly version of said content item for consumption by a particular end-user device; wherein the modification request is indicated by a URL that said Social Media Server provides to said particular end-user device, and which enables said end-user device to automatically request and obtain directly from said Media Authenticity Server the downscaled or mobile-friendly version of said content item that is generated by the Media Authenticity Server if the requested modification is indicated as permitted in said UCII.

In some embodiments, the UCII is stored exclusively in a cloud-based repository, in a record that is associated with said content item; and wherein the UCII is not stored locally with a local copy of said content item; and wherein the Media Authenticity Server, and not an end-user device in which said content item is consumed, performs authenticity check of said content item.

In some embodiments, the UCII accompanies said content item and modified version of said content item, to enable an end-user device that intends to perform content consumption or content playback to authenticate said content item and to check whether a modified version thereof was a result of a permitted modification.

In some embodiments, the UCII further comprises data indicating a copyright holder for said content item, and further indicating permitted or non-permitted operations that a content consumer is authorized or unauthorized to perform with said content item.

In some embodiments, the system further comprises: a web browser module, that is implemented as an integral part of a web browser or as a browser plug-in or as a browser extension or as a browser add-on, which automatically checks whether an incoming content item is associated with a server-side authenticity record that indicates that the incoming content item is an original content item or that it was modified only via permitted modifications.

In some embodiments, said web browser module is configured to block playback of an incoming content item that fails a server-side authenticity check, which verifies whether or not the incoming content item is associated with a server-side authenticity record that indicates that the incoming content item is an original content item or that it was modified only via permitted modifications.

In some embodiments, said web browser module generates and adds an on-screen warning notification, that accompanies playback of an incoming content item that fails a server-side authenticity check, which verifies whether or not the incoming content item is associated with a server-side authenticity record that indicates that the incoming content item is an original content item or that it was modified only via permitted modifications.

In some embodiments, said web browser module generates an interface that enables an end-user to inspect an authenticated log of modifications that were performed to a consumed content item since its original creation until its current version that is consumed on the end-user device; wherein the authenticated log of modifications comprises at least: (i) which permitted modifications were performed, (ii) a time of performance of each permitted modification, and (iii) an identifier of each entity that performed each of said permitted modifications.

In some embodiments, said web browser module obtains said authenticated log of modifications from the Media Authenticity Server via a secure communication link.

In some embodiments, said web browser module obtains said authenticated log of modifications from a cryptographically signed data-item that accompanies the incoming content item.

In some embodiments, the system further comprises: a social media application module, that is implemented as an integral part of a social media application or as a plug-in or extension or add-on to a social media application, which automatically checks whether an incoming content item is associated with a server-side authenticity record that indicates that the incoming content item is an original content item or that it was modified only via permitted modifications.

In some embodiments, said social media application module is configured to block playback of an incoming content item that fails a server-side authenticity check, which verifies whether or not the incoming content item is associated with a server-side authenticity record that indicates that the incoming content item is an original content item or that it was modified only via permitted modifications.

In some embodiments, said social media application module generates and adds an on-screen warning notification, that accompanies playback of an incoming content item that fails a server-side authenticity check, which verifies whether or not the incoming content item is associated with a server-side authenticity record that indicates that the incoming content item is an original content item or that it was modified only via permitted modifications.

In some embodiments, said social media application module generates an interface that enables an end-user to inspect an authenticated log of modifications that were performed to a consumed content item since its original creation until its current version that is consumed on the end-user device; wherein the authenticated log of modifications comprises at least: (i) which permitted modifications were performed, (ii) a time of performance of each permitted modification, and (iii) an identifier of each entity that performed each of said permitted modifications.

In some embodiments, said social media application module obtains said authenticated log of modifications from the Media Authenticity Server via a secure communication link.

In some embodiments, said social media application module obtains said authenticated log of modifications from a cryptographically signed data-item that accompanies the incoming content item.

In some embodiments, the content item is a video content item; wherein the Media Authenticity Server tracks modifications performed on said video content item, and authenticates to other devices that a particular modified version of the video content item is a result of permitted and tracked modifications to said video content item.

In some embodiments, the content item is an image content item; wherein the Media Authenticity Server tracks modifications performed on said image content item, and authenticates to other devices that a particular modified version of the image content item is a result of permitted and tracked modifications to said image content item.

In some embodiments, the content item is an audio content item; wherein the Media Authenticity Server tracks modifications performed on said audio content item, and authenticates to other devices that a particular modified version of the audio content item is a result of permitted and tracked modifications to said audio content item.

In some embodiments, the system further comprises: a media playback application, which automatically checks whether a particular content item is associated with a server-side authenticity record that authorizes playback of the particular content item, as a condition for performing playback of the particular content item.

In some embodiments, the system further comprises: a media editing application, which automatically checks whether a particular content item is associated with a server-side authenticity record that authorizes editing of the particular content item, as a condition for performing editing of the particular content item.

In some embodiments, the system further comprises: a trusted content-editing application (for example, which may one of several pre-defined applications and/or devices that are designated as "trusted" or as "verified" based on one or more criteria or conditions or rules, such as, by using a cryptographic process), which is pre-authorized (i) to perform a limited, pre-defined, set of media modification operations on said content item, and (ii) to log any media modification operations that were performed by the trusted content-editing application, and (iii) to digitally sign on a modified version of the content item that was produced by the trusted content-editing application; wherein the trusted content-editing application is configured to log and to digitally sign while being offline and without requiring an active communication link with the Media Authenticity Server.

In some embodiments, a computerized method comprises: at a Media Authenticity Server, receiving a content item from a Content Creation Device, and performing digital and cryptographic authentication of said Content Creation Device, and generating for said content item a Unique Content-Item Identifier (UCII), that operably accompanies said content item, and that uniquely identifies said content item, and that further indicates which modification operations are permitted with regard to said content item; subsequently: receiving from a Modification-Requesting Device, a Modification Request Descriptor which identifies said content item via said UCII, and which indicates a particular requested modification to said content item; authorizing said particular requested modification to said content item, only if said particular requested modification is indicated as permitted in said UCII.

Some embodiments may include a non-transitory storage medium having stored thereon instructions that, when executed by a processor, cause the processor to perform a method comprising: at a Media Authenticity Server, receiving a content item from a Content Creation Device, performing digital and cryptographic authentication of said Content Creation Device, and generating for said content item a Unique Content-Item Identifier (UCII), that operably accompanies said content item, and that uniquely identifies said content item, and that further indicates which modification operations are permitted with regard to said content item; subsequently, receiving from a Modification-Requesting Device, a Modification Request Descriptor which identifies said content item via said UCII, and which indicates a particular requested modification to said content item; authorizing said particular requested modification to said content item, only if said particular requested modification is indicated as permitted in said UCII.

The present invention includes systems, devices, and methods of providing authenticity and rights verification mechanism for media content and for its derived versions. For example, a media authenticity server is configured to receive a content item, and to generate for it a record having a unique content identifier and indications of permitted modifications, and optionally also copyright information usage restrictions. The media authenticity server authorizes or blocks modifications requests regarding the content item. The media authenticity server tracks and logs the permitted modifications performed on the content item, and makes this log available for inspection to end-user devices via a web browser or via a content consumption application. Optionally, playback or consumption of a modified version of the content item is blocked, or is accompanied by a warning message, if the modified version is not associated with an authenticated log of permitted modifications.

In accordance with embodiments of the present invention, calculations, operations and/or determinations may be performed locally within a single device, or may be performed by or across multiple devices, or may be performed partially locally and partially remotely (e.g., at a remote server) by optionally utilizing a communication channel to exchange raw data and/or processed data and/or processing results.

Although portions of the discussion herein relate, for demonstrative purposes, to wired links and/or wired communications, some embodiments are not limited in this regard, but rather, may utilize wired communication and/or wireless communication; may include one or more wired and/or wireless links; may utilize one or more components of wired communication and/or wireless communication; and/or may utilize one or more methods or protocols or standards of wireless communication.

Some embodiments may be implemented by using a special-purpose machine or a specific-purpose device that is not a generic computer, or by using a non-generic computer or a non-general computer or machine. Such system or device may utilize or may comprise one or more components or units or modules that are not part of a "generic computer" and that are not part of a "general purpose computer", for example, cellular transceivers, cellular transmitter, cellular receiver, GPS unit, location-determining unit, accelerometer(s), gyroscope(s), device-orientation detectors or sensors, device-positioning detectors or sensors, or the like.

Some embodiments may be implemented as, or by utilizing, an automated method or automated process, or a machine-implemented method or process, or as a semi-automated or partially-automated method or process, or as a set of steps or operations which may be executed or performed by a computer or machine or system or other device.

Some embodiments may be implemented by using code or program code or machine-readable instructions or machine-readable code, which may be stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such processor or machine or computer to perform a method or process as described herein. Such code or instructions may be or may comprise, for example, one or more of: software, a software module, an application, a program, a subroutine, instructions, an instruction set, computing code, words, values, symbols, strings, variables, source code, compiled code, interpreted code, executable code, static code, dynamic code; including (but not limited to) code or instructions in high-level programming language, low-level programming language, object-oriented programming language, visual programming language, compiled programming language, interpreted programming language, C, C++, C#, Java, JavaScript, SQL, Ruby on Rails, Go, Cobol, Fortran, ActionScript, AJAX, XML, JSON, Lisp, Eiffel, Verilog, Hardware Description Language (HDL), BASIC, Visual BASIC, Matlab, Pascal, HTML, HTML5, CSS, Perl, Python, PHP, machine language, machine code, assembly language, or the like.

Discussions herein utilizing terms such as, for example, "processing", "computing", "calculating", "determining", "establishing", "analyzing", "checking", "detecting", "measuring", or the like, may refer to operation(s) and/or process(es) of a processor, a computer, a computing platform, a computing system, or other electronic device or computing device, that may automatically and/or autonomously manipulate and/or transform data represented as physical (e.g., electronic) quantities within registers and/or accumulators and/or memory units and/or storage units into other data or that may perform other suitable operations.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments", "some embodiments", and/or similar terms, may indicate that the embodiment(s) so described may optionally include a particular feature, structure, or characteristic, but not every embodiment necessarily includes the particular feature, structure, or characteristic. Furthermore, repeated use of the phrase "in one embodiment" does not necessarily refer to the same embodiment, although it may. Similarly, repeated use of the phrase "in some embodiments" does not necessarily refer to the same set or group of embodiments, although it may.

As used herein, and unless otherwise specified, the utilization of ordinal adjectives such as "first", "second", "third", "fourth", and so forth, to describe an item or an object, merely indicates that different instances of such like items or objects are being referred to; and does not intend to imply as if the items or objects so described must be in a particular given sequence, either temporally, spatially, in ranking, or in any other ordering manner.

Some embodiments may be used in, or in conjunction with, various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, a tablet, an on-board device, an off-board device, a hybrid device, a vehicular device, a non-vehicular device, a mobile or portable device, a consumer device, a non-mobile or non-portable device, an appliance, a wireless communication station, a wireless communication device, a wireless Access Point (AP), a wired or wireless router or gateway or switch or hub, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), or the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA or handheld device which incorporates wireless communication capabilities, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may comprise, or may be implemented by using, an "app" or application which may be downloaded or obtained from an "app store" or "applications store", for free or for a fee, or which may be pre-installed on a computing device or electronic device, or which may be otherwise transported to and/or installed on such computing device or electronic device.

Functions, operations, components and/or features described herein with reference to one or more embodiments of the present invention, may be combined with, or may be utilized in combination with, one or more other functions, operations, components and/or features described herein with reference to one or more other embodiments of the present invention. The present invention may thus comprise any possible or suitable combinations, re-arrangements, assembly, re-assembly, or other utilization of some or all of the modules or functions or components that are described herein, even if they are discussed in different locations or different chapters of the above discussion, or even if they are shown across different drawings or multiple drawings.

While certain features of some demonstrative embodiments of the present invention have been illustrated and described herein, various modifications, substitutions, changes, and equivalents may occur to those skilled in the art. Accordingly, the claims are intended to cover all such modifications, substitutions, changes, and equivalents.

What is claimed is:

1. A system comprising:
a Media Authenticity Server, comprising one or more processors that are configured:
to receive a content item from a Content Creation Device,
to perform digital and cryptographic authentication of said Content Creation Device,
and to generate for said content item a Unique Content-Item Identifier (UCII), that operably accompanies said content item, and that uniquely identifies said content item, and that further indicates which modification operations are permitted with regard to said content item;
subsequently,
to receive from a Modification-Requesting Device, a Modification Request Descriptor which identifies said content item via said UCII, and which indicates a particular requested modification to said content item;
to authorize said particular requested modification to said content item, only if said particular requested modification is indicated as permitted in said UCII;
wherein the modification request is generated by a Social Media Server, which requests to provide a downscaled or mobile-friendly version of said content item for consumption by a particular end-user device;
wherein the modification request is indicated by a Uniform Resource Locator (URL) that said Social Media Server provides to said particular end-user device,
and which enables said end-user device to automatically request and obtain directly from said Media Authenticity Server the downscaled or mobile-friendly version of said content item that is generated by the Media Authenticity Server if the requested modification is indicated as permitted in said UCII.

2. The system of claim 1,
wherein the Media Authenticity Server further comprises:
a Modifications Tracking Unit,
to track permitted modifications to said content item,
and
to create or update a modifications logbook that is associated with a modified version of said content item, and that logs (i) which permitted modifications were performed, (ii) a time of performance of each permitted modification, and (iii) an identifier of each entity that performed each of said permitted modifications.

3. The system of claim 2,
wherein the Media Authenticity Server further comprises:
a cryptographic unit, to generate a cryptographic signature on (I) a modified version of said content item, and (II) an authenticity information item that indicates which permitted modifications were performed on a previous version of said content item to yield said modified version of the content item;
and to provide said cryptographic signature to said Modification-Requesting Device together with said modified version of the content item.

4. The system of claim 1,
wherein the particular requested modification is performed by a content modification unit that is part of the Media Authenticity Server, and is not part of the Modification-Requesting Device, to ensure that only permitted modifications are performed on the content item.

5. The system of claim 1,
wherein the particular requested modification is performed in response to an Application Programming Interface (API) request, submitted by the Modification-Requesting Device to the Media Authenticity Server.

6. The system of claim 1,
wherein the UCII is stored exclusively in a cloud-based repository, in a record that is associated with said content item;
and wherein the UCII is not stored locally with a local copy of said content item;
and wherein the Media Authenticity Server, and not an end-user device in which said content item is consumed, performs authenticity check of said content item.

7. The system of claim 1,
wherein the UCII accompanies said content item and modified version of said content item, to enable an end-user device that intends to perform content consumption or content playback to authenticate said content item and to check whether a modified version thereof was a result of a permitted modification.

8. The system of claim 1,
wherein the UCII further comprises data indicating a copyright holder for said content item, and further indicating permitted or non-permitted operations that a content consumer is authorized or unauthorized to perform with said content item.

9. The system of claim 1, further comprising:
a web browser module,
that is implemented as an integral part of a web browser or as a browser plug-in or as a browser extension or as a browser add-on,
which automatically checks whether an incoming content item is associated with a server-side authenticity record that indicates that the incoming content item is an original content item or that it was modified only via permitted modifications.

10. The system of claim 9,
wherein said web browser module is configured to block playback of an incoming content item that fails a server-side authenticity check, which verifies whether or not the incoming content item is associated with a server-side authenticity record that indicates that the incoming content item is an original content item or that it was modified only via permitted modifications.

11. The system of claim 9,
wherein said web browser module generates and adds an on-screen warning notification, that accompanies playback of an incoming content item that fails a server-side authenticity check, which verifies whether or not the incoming content item is associated with a server-side authenticity record that indicates that the incoming content item is an original content item or that it was modified only via permitted modifications.

12. The system of claim 9,
wherein said web browser module generates an interface that enables an end-user to inspect an authenticated log of modifications that were performed to a consumed content item since its original creation until its current version that is consumed on the end-user device,
wherein the authenticated log of modifications comprises at least: (i) which permitted modifications were performed, (ii) a time of performance of each permitted modification, and (iii) an identifier of each entity that performed each of said permitted modifications.

13. The system of claim 9,
wherein said web browser module obtains said authenticated log of modifications from the Media Authenticity Server via a secure communication link.

14. The system of claim 9,
wherein said web browser module obtains said authenticated log of modifications from a cryptographically signed data-item that accompanies the incoming content item.

15. The system of claim 1, further comprising:
a social media application module,
that is implemented as an integral part of a social media application or as a plug-in or extension or add-on to a social media application,
which automatically checks whether an incoming content item is associated with a server-side authenticity record that indicates that the incoming content item is an original content item or that it was modified only via permitted modifications.

16. The system of claim 15,
wherein said social media application module is configured to block playback of an incoming content item that fails a server-side authenticity check, which verifies whether or not the incoming content item is associated with a server-side authenticity record that indicates that the incoming content item is an original content item or that it was modified only via permitted modifications.

17. The system of claim 15,
wherein said social media application module generates and adds an on-screen warning notification, that accompanies playback of an incoming content item that fails a server-side authenticity check, which verifies whether or not the incoming content item is associated with a server-side authenticity record that indicates that the incoming content item is an original content item or that it was modified only via permitted modifications.

18. The system of claim 15,
wherein said social media application module generates an interface that enables an end-user to inspect an authenticated log of modifications that were performed to a consumed content item since its original creation until its current version that is consumed on the end-user device,
wherein the authenticated log of modifications comprises at least: (i) which permitted modifications were performed, (ii) a time of performance of each permitted modification, and (iii) an identifier of each entity that performed each of said permitted modifications.

19. The system of claim 15,
wherein said social media application module obtains said authenticated log of modifications from the Media Authenticity Server via a secure communication link.

20. The system of claim 15,
wherein said social media application module obtains said authenticated log of modifications from a cryptographically signed data-item that accompanies the incoming content item.

21. The system of claim 1,
wherein the content item is a video content item;
wherein the Media Authenticity Server tracks modifications performed on said video content item, and authenticates to other devices that a particular modified version of the video content item is a result of permitted and tracked modifications to said video content item.

22. The system of claim 1,
wherein the content item is an image content item;
wherein the Media Authenticity Server tracks modifications performed on said image content item, and authenticates to other devices that a particular modified version of the image content item is a result of permitted and tracked modifications to said image content item.

23. The system of claim 1,
wherein the content item is an audio content item;
wherein the Media Authenticity Server tracks modifications performed on said audio content item, and authenticates to other devices that a particular modified version of the audio content item is a result of permitted and tracked modifications to said audio content item.

24. The system of claim 1, further comprising:
a media playback application,
which automatically checks whether a particular content item is associated with a server-side authenticity record that authorizes playback of the particular content item, as a condition for performing playback of the particular content item.

25. The system of claim 1, further comprising:
a media editing application,
which automatically checks whether a particular content item is associated with a server-side authenticity record that authorizes editing of the particular content item, as a condition for performing editing of the particular content item.

26. The system of claim 1, further comprising:
a trusted content-editing application, which is pre-authorized (i) to perform a limited, pre-defined, set of media modification operations on said content item, and (ii) to log any media modification operations that were performed by the trusted content-editing application, and (iii) to digitally sign on a modified version of the content item that was produced by the trusted content-editing application;
wherein the trusted content-editing application is configured to log and to digitally sign while being offline and without requiring an active communication link with the Media Authenticity Server.

27. A computerized method comprising:
at a Media Authenticity Server,
receiving a content item from a Content Creation Device,
performing digital and cryptographic authentication of said Content Creation Device,
and generating for said content item a Unique Content-Item Identifier (UCII), that operably accompanies said content item, and that uniquely identifies said content item, and that further indicates which modification operations are permitted with regard to said content item;
subsequently,
receiving from a Modification-Requesting Device, a Modification Request Descriptor which identifies said content item via said UCII, and which indicates a particular requested modification to said content item;
authorizing said particular requested modification to said content item, only if said particular requested modification is indicated as permitted in said UCII;
wherein the modification request is generated by a Social Media Server, which requests to provide a downscaled or mobile-friendly version of said content item for consumption by a particular end-user device;
wherein the modification request is indicated by a Uniform Resource Locator (URL) that said Social Media Server provides to said particular end-user device,
and which enables said end-user device to automatically request and obtain directly from said Media Authenticity Server the downscaled or mobile-friendly version of said content item that is generated by the Media Authenticity Server if the requested modification is indicated as permitted in said UCII.

28. A non-transitory storage medium having stored thereon instructions that, when executed by a processor, cause the processor to perform a method comprising:
at a Media Authenticity Server,
receiving a content item from a Content Creation Device,
performing digital and cryptographic authentication of said Content Creation Device,
and generating for said content item a Unique Content-Item Identifier (UCII), that operably accompanies said content item, and that uniquely identifies said content item, and that further indicates which modification operations are permitted with regard to said content item;
subsequently,
receiving from a Modification-Requesting Device, a Modification Request Descriptor which identifies said content item via said UCII, and which indicates a particular requested modification to said content item;
authorizing said particular requested modification to said content item, only if said particular requested modification is indicated as permitted in said UCII;
wherein the modification request is generated by a Social Media Server, which requests to provide a downscaled or mobile-friendly version of said content item for consumption by a particular end-user device;
wherein the modification request is indicated by a Uniform Resource Locator (URL) that said Social Media Server provides to said particular end-user device,
and which enables said end-user device to automatically request and obtain directly from said Media Authenticity Server the downscaled or mobile-friendly version of said content item that is generated by the Media Authenticity Server if the requested modification is indicated as permitted in said UCII.

* * * * *